Jan. 21, 1964 H. DORENDORF ETAL 3,119,026

SEMICONDUCTOR DEVICE WITH CURRENT DEPENDENT EMITTER YIELD AND VARIABLE BREAKTHROUGH VOLTAGE

Filed June 22, 1959 2 Sheets-Sheet 1

United States Patent Office 3,119,026 Patented Jan. 21, 1964

3,119,026

SEMICONDUCTOR DEVICE WITH CURRENT DEPENDENT EMITTER YIELD AND VARIABLE BREAKTHROUGH VOLTAGE

Heinz Dorendorf and Alfred Ottmann, Munich, Germany, and Lothar Wandinger, Asbury Park, N.J., assignors to Siemens & Halske Aktiengesellschaft Berlin and Munich, a corporation of Germany Filed June 22, 1959, Ser. No. 821,908
Claims priority, application Germany June 25, 1958
6 Claims. (Cl. 307—88.5)

This invention is concerned with a semiconductor device adapted for use as a switching diode with current dependent emitter yield and variable breakthrough voltage.

The various objects and features of the invention will appear from the description which will be rendered below with reference to the accompanying drawings, in which.

Figures 5, 6, 7, 8, 9, 10:
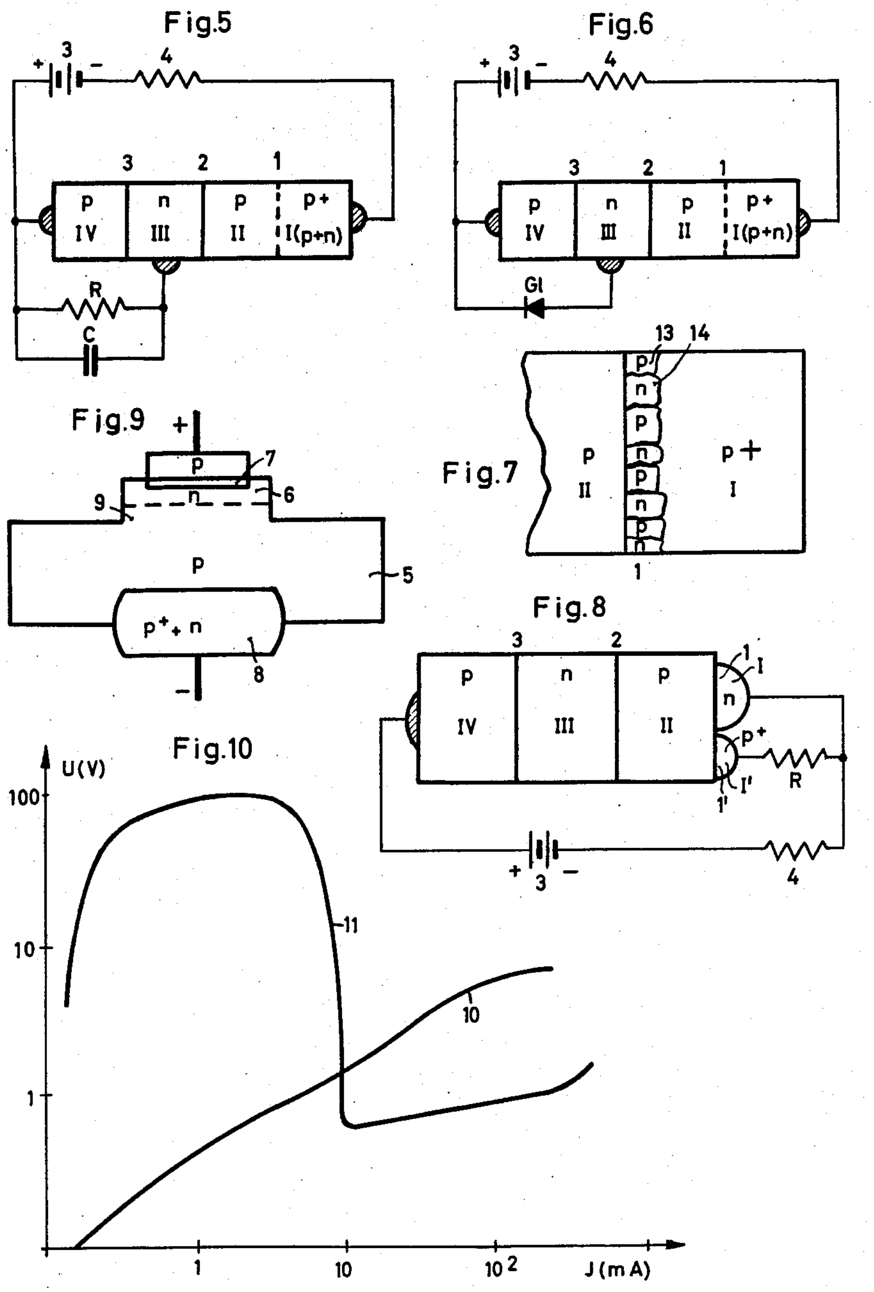
FIGS. 5 and 6 illustrate modified arrangements.

FIG. 7 explains the action of an interface (recombination zone);

FIGS. 8 and 9 show further examples of the invention; and

FIG. 10 shows a typical characteristic curve of an arrangement according to the invention.

It is known to use as a switching diode a diode with four serially related semiconductor zones containing alternately p- and n-impurity centers, owing to its negative current-voltage characteristic.

Figure 1:
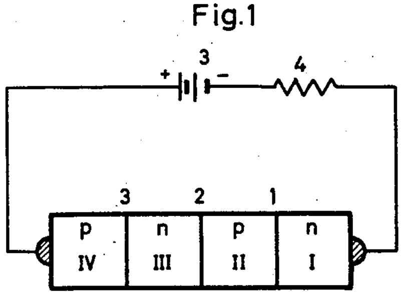
FIGS. 1 and 2 show arrangements to explain the action of a switching diode.
Figure 2:
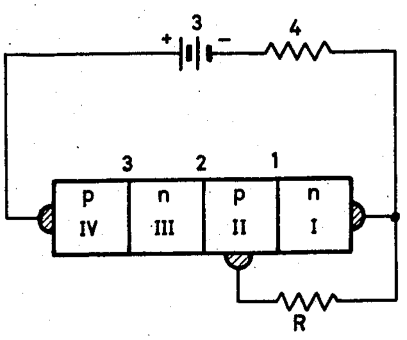

The action of such switching elements, that is, the manner in which the negative current-voltage characteristic is brought about, shall now be entered into; for this purpose, there shall first be considered, with reference to FIGS. 1 and 2, a diode with its four zones I, II, III and IV and the corresponding p-n junctions 1, 2 and 3, neglecting the shunt extending by way of resistor R in FIG. 2. The circuit extends by way of a direct current source 3 and a resistor 4. The polarization is such that the central p-n junction 2 is in blocking direction. This arrangement will block low voltages and the entire voltage will lie on the central p-n junction.

Figures 3, 4:
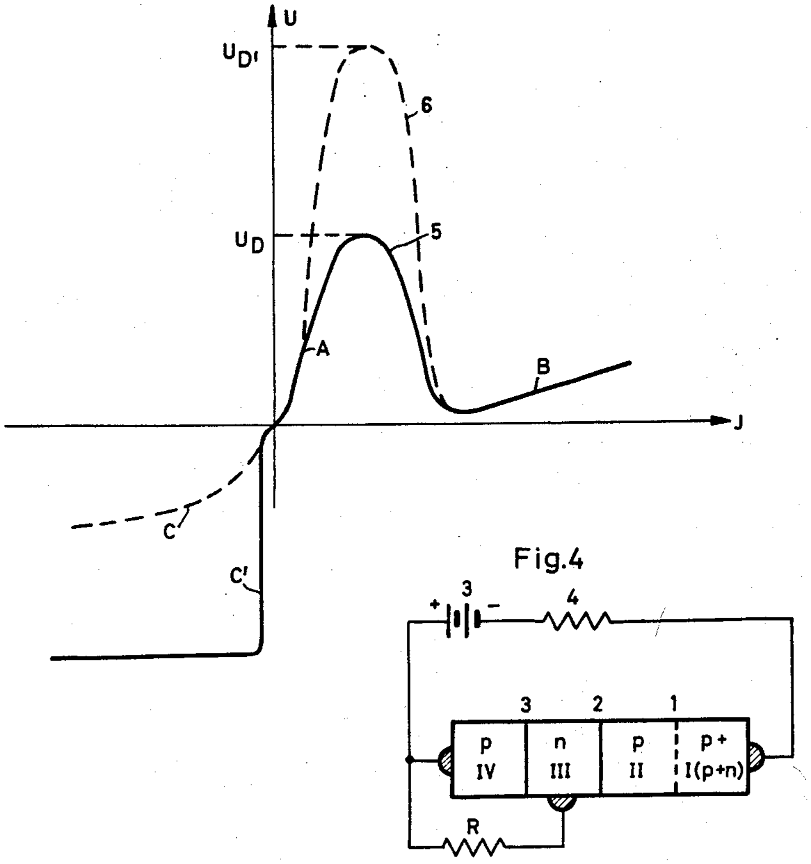
FIG. 3 shows curves to explain the behavior of a switching diode.
FIG. 4 represents an arrangement according to the invention.

This behavior is represented in FIG. 3 by the curve branch A of the current-voltage characteristic. Minority carriers are injected from the two outer zones I and IV (FIGS. 1 and 2) into the central zones II and III, which reach the central junction 2, causing at such junction with increasing voltage an increase of the blocking current, thereby effecting increasing injection of minority carriers and therewith again an increase of the blocking current. Upon reaching the breakthrough voltage of the p-n junction 2, the element becomes unstable. In the current-voltage characteristic in FIG. 3, this point is marked at $U_D$. The areas II and III as well as the junction 2 are flooded with minority carriers and the voltage at the arrangement breaks down (branch B). When the voltage source is oppositely polarized, I and III will be in blocking direction and the arrangement will block until the Zener breakthrough of these two outer p-n junctions (branch C′).

FIGS. 4, 5 and 6 show arrangements in which, according to the invention, at least one of the two outer zones I or IV is oppositely doped with impurity centers which produce the same conductivity type as the respectively adjacent inner zone II or III, such zone accordingly containing donors and also acceptors, FIG. 5 differing from FIG. 4 merely in the provision of a capacitor C connected in parallel with resistor R, and FIG. 6 differs from FIG. 4 in employing a rectifier G1 in place of the resistor R. The opposing doping is in each case such, that the conductivity of the outer zone, for example, zone I, is of the same type as that of the adjacent inner zone II, namely, that it is p-conductive. The p-conductivity of the outer zone I is moreover greater than that of the adjacent zone II. The concentration of the impurity centers which produce the conductivity type opposite to that of the adjacent inner zone, that is, in FIG. 4, for example, the concentration of the donors is thereby according to the invention such, that the junction 1, while injecting in flow direction electrons into the zone II, has in the otherwise blocking direction a low ohmic resistance. The characteristic of this arrangement is on the unstable side, that is, when the p-n junction 2 is in blocking direction, identical with the p-n-p-n diode and corresponding to the curve branches A and B of FIG. 3.

When the voltage source is oppositely polarized, there will not be obtained a blocking behavior as in the p-n-p-n diode, since the p-n junction 2 lies in flow direction, junction 1 constituting moreover, as compared with FIGS. 1 and 2, a barrier free or blocking free contact and the p-n junction 3, representing the border of a diffused and an alloyed layer, having due to the strong doping of the zone IV a Zener voltage lying below 1 volt. The arrangement according to FIG. 4 therefore will not block in the direction of the voltage connected thereto but will exhibit a pronounced flow characteristic.

The action of the junction 1 of the arrangements shown in FIGS. 4, 5 and 6 shall now be explained more in detail with reference to FIG. 7.

The doping of the zone I is not homogeneous. In accordance with the invention, a mixture is used for the alloying pill, which contains donors as well as acceptors. For example, indium with an admixture of about 2% arsenic, is employed for an alloyed p-n junction in p-germanium. It is understandable that n-conductive (for example, 14) and p-conductive areas (for example, 13) will then appear next to one another in the interface or recrystallization zone. The n-conductive areas produce an electron injection and the p-conductive areas produce an ohmic shunt which becomes less effective with increasing current, since the resistance of a p-n junction in flow direction becomes with increasing current increasingly lower. An alloyed junction of this type exhibits with increasing current a strong increase in the minority carrier injection.

The arrangement according to the invention, therefore, has great advantages as compared with arrangements employing the known indium-tin-contact. Due to the additional n-doping, the zone I will exhibit great electron injection and such injection of minority carriers into the zone II is moreover at low currents very slight, increasing strongly only shortly before the breakthrough voltage is reached. This results in obtaining in the blocking or barrier range low blocking currents and in the low ohmic range slight residual voltages, a property very well exhibited by a diffusion p-n junction, but which has made an alloyed p-n junction until now very unsuitable as an emitter in a switching diode, owing to the fact that strong injection is present even with lowest currents.

In accordance with the invention, this current dependent minority carrier injection is also obtained by the arrangement shown in FIG. 8, wherein at least one inner zone, for example, zone II, lies adjacent to two semiconducting outer zones, one of which, for example, zone I, is of the opposite conduction type while the other, for example, I′ is of the same conduction type. The outer zone I′ has moreover a higher conductivity than the inner zone II adjacent thereto.

The indium-tin-contact is, accordingly, subdivided into a normal p-n junction 1 and an ohmic contact 1'. The p-n junction is produced, for example, by alloying into the structure tin-arsenic, and the ohmic contact is produced by alloying thereinto indium or gold. Both contacts are interconnected in the case of an arrangement corresponding to FIG. 8. In the arrangement illustrated in FIG. 4, they are intimately fused together. It will be readily understood, that the interface or recrystallization zone of the indium-tin-contact consists, as explained before, of many crystallites, partly of an injecting and partly of an ohmic character.

The ohmic shunt may also be produced by bridging one of the two outer zones by means of a resistor R. Its action may be explained by considering the current amplifying factor $a$; $a_1$ determining that part of the minority carriers which, flowing from IV to III, reaches the p-n junction 2, and $a_2$ determining that part of the charge carriers which, flowing from I to II, reaches the junction 2. This part is determined by the loss of charge carriers along this path by recombination and by the fractional part of the emitter current which is carried by the charge carriers injected into the base zone. It is known that the breakthrough at the junction 2 appears when $a_1+a_2\geqq 1$. Since $a$ is current dependent, the $a$-value is smaller when part of the charge carriers leaks off by way of the ohmic shunt. With increasing voltage and therewith increasing current, the resistance of the respective junctions 1 and 3 will decrease, and the shunt will become more and more ineffective. Accordingly, this ohmic shunt will effect a minority carrier injection from the bridged outer zone into the adjacent inner zone, which is slight for low currents and quickly increases prior to reaching the breakthrough voltage.

However, since the ohmic resistance due to change of the $a$-value also changes the breakthrough voltage $U_D$ of the diode (see FIG. 3), it is, as proposed by the invention, possible to adjust the diode for a desired breakthrough voltage by employing different resistance values for the ohmic shunt. This is of great advantage because it is very difficult to produce diodes all of which switch over at the same breakthrough voltage $U_D$. The invention therefore proposes to interconnect at least one of the two inner zones II and III with the outer zone I or IV by way of regulatable resistor R. The breakthrough voltage can then be varied by variation of the resistance value. The resistor R may thereby have a resistance value which depends upon exterior effects, such as temperature, magnetic field or light. These exterior influences will then effect a change of $U_D$ and therewith switching operation of the diode.

FIG. 3 shows in dotted lines a characteristic curve 6 of an arrangement according to the invention, employing the resistor R. $U_D$ is the breakthrough voltage which has been increased by the resistor R. Upon oppositely polarizing the voltage, the characteristic curve 5, without resistor, that is, for $R=\infty$, and 6, with resistor, will basically differ. The reason has already been explained in connection with the description of FIG. 4. The p-regions of the interface or recrystallization zone act as the ohmic shunt extending over the resistor R. The junction which is bridged in FIGS. 2 and 4 accordingly does not act in blocking sense upon oppositely polarizing the voltage.

While the diode of FIG. 1 blocks without R, it shows when equipped with R (FIG. 2) a pronounced flow characteristic. It is thereby assumed that the p-n junction 3, or generally, the non-bridged p-n junction, has a very low blocking voltage. This is practically always the case for the junction 3 when the n-zone III has been produced by diffusion and the p-zone IV by alloying. This flow characteristic has the following advantage: When it is desired to come from the blocking condition A into the conducting condition B (FIG. 3), it is in the case of a normal diode required to provide a voltage which is higher than $U_D$. This is, in the case of a switching diode with a resistor according to the invention unnecessary. Momentary polarization in flow direction (condition C) is effected, whereby the semiconductor is flooded with minority carriers and the voltage $U_D'$ reduced, thus coming from C to B without any great voltage expenditure.

It is according to the invention also possible to combine a low breakthrough voltage $U_D$ with a good flow characteristic by using in place of the resistor R a rectifier (FIG. 6) which impedes the current through the shunt when the p-n junction is in flow direction. Maximum electron injection will then result in II.

Upon connecting a capacitor in parallel in the arrangement according to FIG. 5, the diode may be used for generating oscillations.

A change of the breakthrough voltage is also effected by the connection of the resistor R in FIG. 8, in the lead to the p±contact. Such resistor, particularly when variable, can again serve for the regulation of the breakthrough voltage of the arrangement. A rectifier may again be substituted for the resistor for impeding the current through the contact 1' when the contact 1 is in flow direction. In such case will be obtained maximum electron injection into the region II. It is moreover possible to cause the arrangement to oscillate by the insertion of an RC-member. The resistor R may also be controlled by another value to adapt the arrangement for amplification purposes.

The breakthrough voltage of the arrangements shown in FIGS. 4, 5 and 6 may also be adjusted to a predetermined value, for example, by bridging over the junction 3.

Particularly favorable conditions will result when the value of the resistor R lies in the order of magnitude of the flow resistance of the bridge p-n junction.

FIG. 9 shows an example of an embodiment according to the invention. Upon a semiconductor body 5 with an impurity center conductivity, in particular low conductivity, is produced by diffusion, a layer 6 of opposite conduction type but particularly of higher conductivity. The two outer zones 7 and 8 are formed by alloying. In addition, at least the outer zone 8 is n- and also p-doped. The zone junctions have a cross sectional area smaller than that of the disk-shaped semiconductor 5. The outer zones disposed upon the semiconductor body 5 also have a cross-sectional area smaller than that of the semiconductor. Part of the extension 9 of the disk-shaped semiconductor 5 is formed by diffusion in a median zone 6 over its entire extent.

Examples of this arrangement were produced as described below.

Wafers of p-germanium, 2.7 millimeters in diameter, 130 microns thick, with a specific resistance of 8–10 ohm centimeters, were used as initial material. Into these wafers, on all sides thereof were diffused arsenic layers 15 microns thick, with a surface concentration of $5.10^{17}$ impurity centers per cm.$^3$. The surface was thereafter etched over briefly, that is, about 5 seconds, with $CP_4=1$ part boron dissolved in 24 parts glacial acetic acid, 24 parts 40% fluorine acid and 40 parts 65% nitric acid. After this treatment, a small circular spot on one side of the wafer was masked and the entire arrangement was again etched in the same solution for about 1 minute. A circular aluminum layer, 1 millimeter in diameter was subsequently vaporized upon this spot, which was diffused into the structure without permeating the p-n junction provided by diffusion. Upon the opposite side of the wafer was previously placed and alloyed in position, a pill 0.9–1 millimeter in diameter consisting of 98 percent by weight of indium plus 2 percent by weight of arsenic. The alloying temperature was varied between 350° C. and 500° C. The alloying duration amounted to 4–6 minutes, thereby achieving alloying fronts of differing depth of penetration and therewith different base thickness. The thickness of the semiconductor disk 5 is indicated in a change of the breakthrough voltage. With low alloying temperature and thicknesses of 100 microns are obtained breakthrough voltages of 100–150 v.; with higher alloying temperatures and thicknesses of 25 microns are obtained breakthrough voltages of 20–30 v.

The composition of the alloying pill is essential for the appearance of an unstable range. It has been shown that the use of purest indium as a p± contact shows no emitter action. The addition of a n-doping material such as arsenic is essential.

FIG. 10 shows a typical characteristic curve of an arrangement according to the invention, which had been produced as described above. The curve 10 indicates the dependence of the current upon the voltage, in pass direction. The current assumes high values even in the case of low voltages. Curve 11 shows the current-voltage characteristic in blocked condition. The break-through occurs at a voltage of 100 v. and a current of about 2 ma. The voltage at the arrangement goes back to the pass value of 0.4–0.5 v. and the current increases to the value given by the load resistance. The rise of the characteristic curve in the pass condition takes place very slowly. At IV there will flow 200 ma., at 1.6 v. 400 ma.

Changes may be made within the scope and spirit of the appended claims which define what is believed to be new and desired to have protected by Letters Patent.

We claim:

1. A semiconductor device having four serially related semiconductor zones which alternately contain p and n impurity centers, and comprising a body of p-conductive germanium having a specific resistance of 8–10 ohm centimeters, wherein at least one of the outer zones is doped with indium to produce the same conduction type as that of the inner zone lying adjacent thereto but providing for a conductivity which exceeds that of the adjacent inner zone, said one outer zone also containing arsenic to produce a conduction type opposite to that of said inner zone in a concentration so great that said outer zone injects in one direction minority carriers into said inner zone but in a concentration so low that no blocking action is effected in the other direction, said indium and arsenic being respectively present in a ratio by weight of substantially 98 to 2.

2. A device according to claim 1, comprising a resistor and means for interconnecting said resistor with one of said inner zones and an outer zone.

3. A device according to claim 1, comprising a semiconductor body of predetermined conduction type and exhibiting relatively slight conductivity, a layer of opposite conduction type and higher conductivity provided upon said body by diffusion, an outer zone provided on said body and said layer by alloying, at least one of said outer zones being both n- and p-doped.

4. A method of producing a junction between two zones of different conductivity but identical conduction type, forming at least one of the two outer junctions of a semiconductor diode for switching and triggering purposes, having four serially successively disposed semiconducting zones, wherein the two centrally positioned zones are connected by a p-n junction, comprising alloying into an adjacent outer zone, of a body of p-conductive germanium having a specific resistance of 8–10 ohm centimeters, a pill containing substantially 98% by weight indium which produces in the neighboring central zone impurity centers of the same conduction type and containing substantially 2% by weight arsenic which produces impurity centers of the opposite conduction type, whereby the amount of arsenic on the one hand is such that the concentration of the impurity centers produced thereby in the recrystallization layer is, as compared with the impurity centers produced by the indium, so large that a noticeable injection action of minority carriers of an electrode alloyed on said outer zone occurs in the semiconductor body, while being on the other hand so small that no blocking action can as yet appear in the other direction.

5. A semiconductor device having four serially related semiconductor zones which alternately contain p- and n-impurity centers, wherein at least one of the outer zones is doped with impurity centers which produce the same conduction type as that of the inner zone lying adjacent thereto but providing for a conductivity which exceeds that of the adjacent inner zone, said one outer zone also containing impurity centers of a conduction type opposite to that of said inner zone in a concentration such that said outer zone injects in one direction minority carriers into said inner zone while exhibiting no blocking action in the other direction, said one outer zone being physically subdivided into a first part having a conduction type opposite to that of the adjacent inner zone and a second part having a conduction type identical to that of said adjacent inner zone, said second part having higher conductivity, a circuit including a resistor for bridging said first and second parts, a current source, means including a further resistor for connecting said circuit with one pole of said current source, and means for connecting the other pole of said current source with the other outer zone.

6. A semiconductor device having four serially related semiconductor zones which alternately contain p- and n-impurity centers and comprise a first p- and n-conductive zone in series relationship with three further zones having, as seen in the series direction, p- and n- and p-conductivity, wherein at least one of the outer zones is doped with impurity centers which produce the same conduction type as that of the inner zone lying adjacent thereto but providing for a conductivity which exceeds that of the adjacent inner zone, said one outer zone also containing impurity centers of a conduction type opposite to that of said inner zone in a concentration such that said outer zone injects in one direction minority carriers into said inner zone while exhibiting no blocking action in the other direction, said first zone being subdivided into two parts, one part being n-conductive and the other part being p-conductive but having a conductivity exceeding that of the adjacent p-conductive zone.

References Cited in the file of this patent

UNITED STATES PATENTS

| | | |
|---|---|---|
| 2,655,609 | Shockley | Oct. 13, 1953 |
| 2,655,610 | Ebers | Oct. 13, 1953 |
| 2,778,885 | Shockley | Jan. 22, 1957 |
| 2,857,527 | Pankove | Oct. 21, 1958 |
| 2,936,425 | Shockley | May 10, 1960 |
| 2,953,693 | Philips | Sept. 20, 1960 |
| 3,001,895 | Schwartz et al. | Sept. 26, 1961 |

OTHER REFERENCES

Moll et al.: "P–N–P–N Transistor Switches," Proceedings of the IRE, vol. 44, pp. 1174–1182, September 1956.